(12) United States Patent
Moore

(10) Patent No.: US 7,568,988 B2
(45) Date of Patent: Aug. 4, 2009

(54) CHAIN JOINT SEAL

(75) Inventor: Dennis L. Moore, Talbott, TN (US)

(73) Assignee: Jeffrey Chain Corporation, Morristown, TN (US)

( * ) Notice: Subject to any disclaimer, the term of this patent is extended or adjusted under 35 U.S.C. 154(b) by 493 days.

(21) Appl. No.: 11/003,877

(22) Filed: Dec. 3, 2004

(65) Prior Publication Data

US 2006/0122019 A1    Jun. 8, 2006

(51) Int. Cl.
*F16G 13/02* (2006.01)

(52) U.S. Cl. .................. 474/226; 474/206

(58) Field of Classification Search .......... 474/229, 474/223, 226; 277/603, 608, 609, 611, 630, 277/638, 639, 644
See application file for complete search history.

(56) References Cited

U.S. PATENT DOCUMENTS

| | | | |
|---|---|---|---|
| 2,411,214 A | 11/1946 | Keech | |
| 3,206,258 A | 9/1965 | Heinrich | |
| 3,235,315 A | 2/1966 | Schnacke | |
| 3,365,246 A | 1/1968 | Otis et al. | |
| 3,379,480 A | 4/1968 | Storm | |
| 3,391,964 A | 7/1968 | Miyake | |
| 3,437,385 A | 4/1969 | Deli | |
| 3,451,727 A | 6/1969 | Deli et al. | |
| 4,094,515 A * | 6/1978 | Araya et al. | 277/402 |
| 4,464,151 A * | 8/1984 | Kahl | 474/231 |
| 4,729,754 A | 3/1988 | Thuerman | |
| 4,941,315 A | 7/1990 | Thuerman | |
| 5,092,118 A | 3/1992 | VanDeMark | |
| 5,269,729 A * | 12/1993 | Thuerman et al. | 474/207 |
| 5,425,679 A | 6/1995 | Utz | |
| 5,806,658 A | 9/1998 | Hannum | |
| 6,074,318 A | 6/2000 | Tanaka et al. | |
| 6,141,892 A | 11/2000 | Moore et al. | |

\* cited by examiner

*Primary Examiner*—Richard W L Ridley
*Assistant Examiner*—Terence Boes
(74) *Attorney, Agent, or Firm*—Holland & Knight LLP

(57) ABSTRACT

A preferred embodiment of the invention described herein includes a method and apparatus for providing a seal between at least the outer sidebar and pin bushing of a chain link assembly. The apparatus includes a seal having an outer collar and an inner resilient ring, the outer collar preferably having a mating ridge and the resilient ring being molded onto the collar. This seal also includes outer ribs for providing a sealed contact against the outer sidebar, and may include inner ribs. The seal is part of a chain link assembly positioned between the outer and inner sidebars and surrounding a pin bushing end. A fluid (e.g., grease) may be advantageously placed between the ribs, lubricating the rib—sidebar interface and thereby reducing wear of the ribs.

13 Claims, 4 Drawing Sheets

SECTION A-A

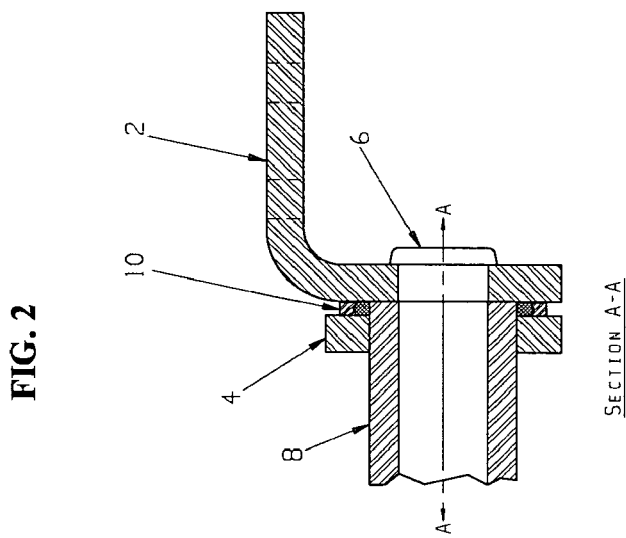
FIG. 2
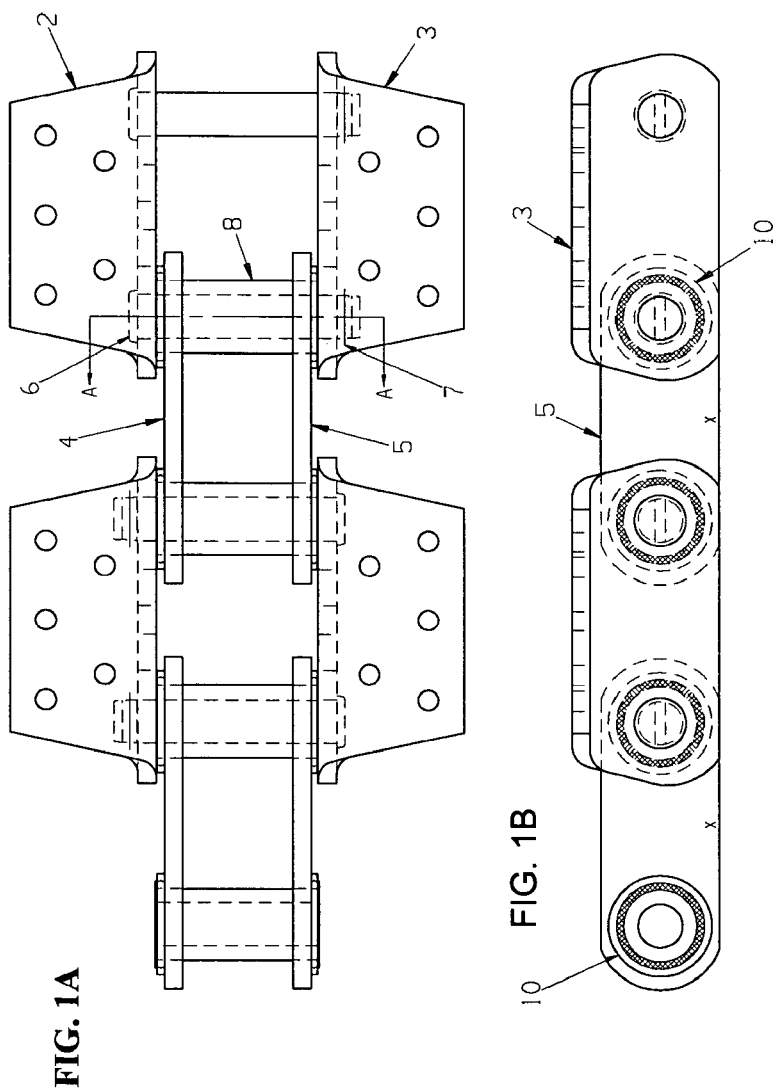
FIG. 1A
FIG. 1B

FIG. 3A
FIG. 3B
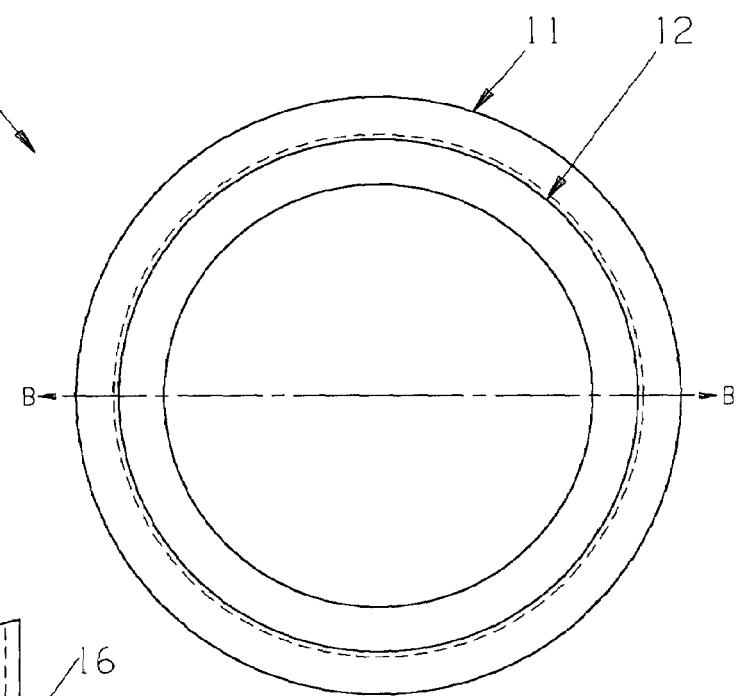
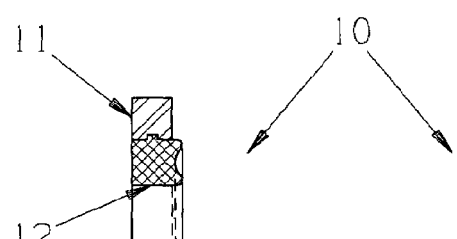
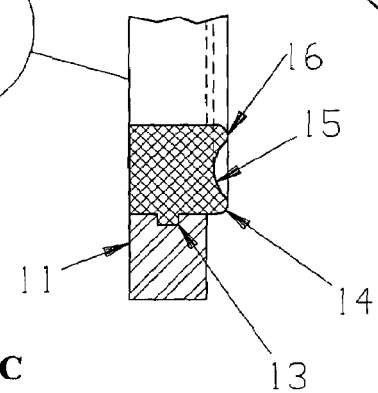
FIG. 3C

FIG. 4A
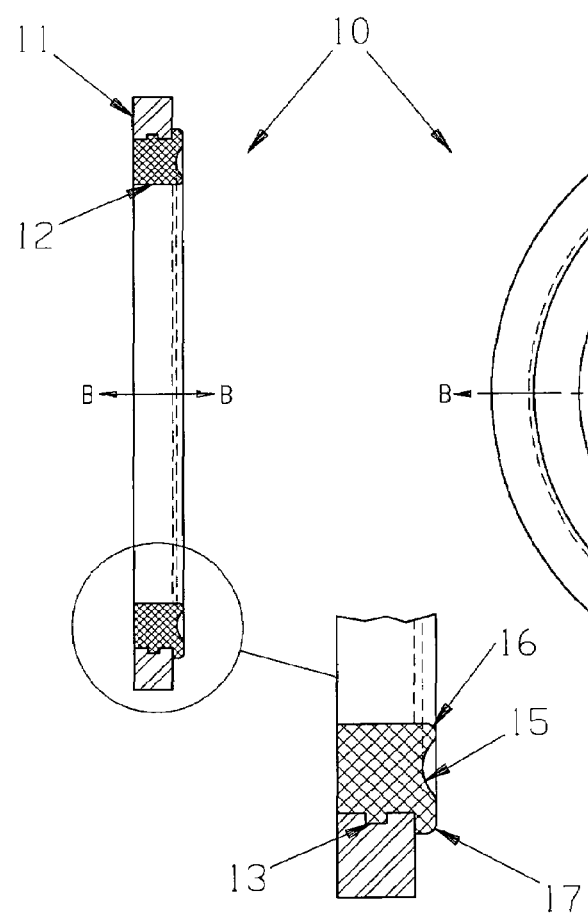
FIG. 4B
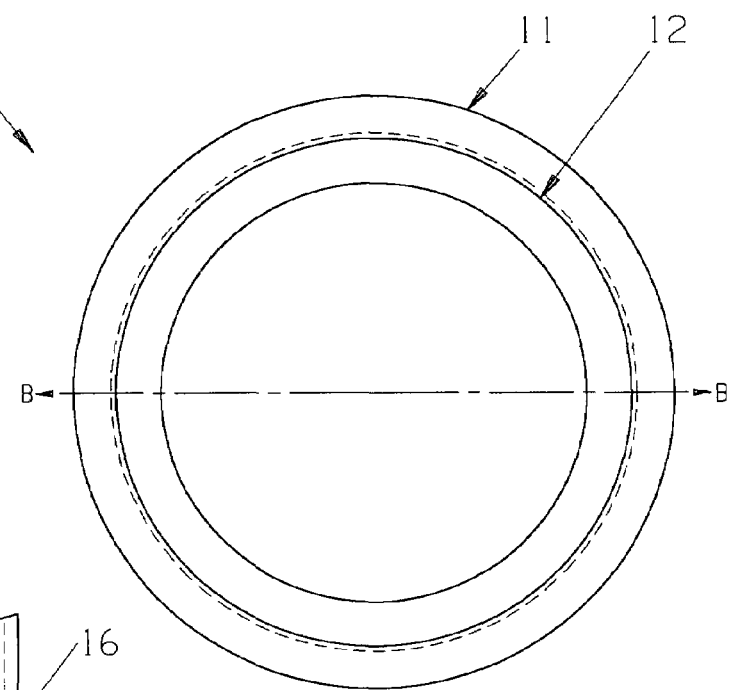
FIG. 4C

FIG. 5A
FIG. 5B
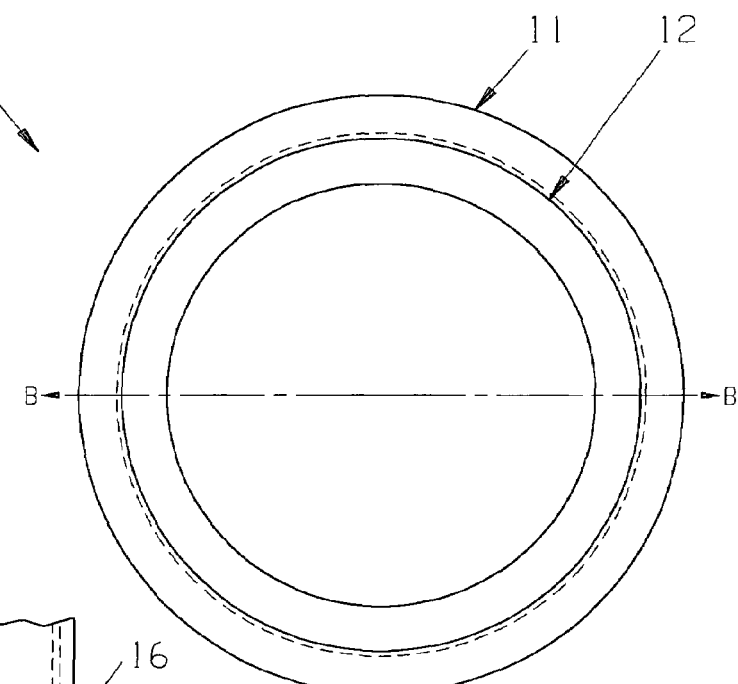
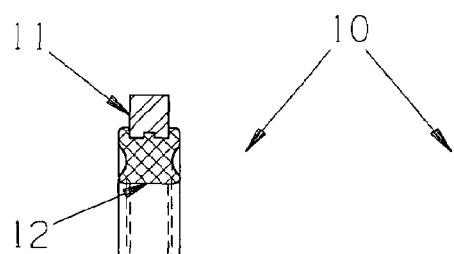
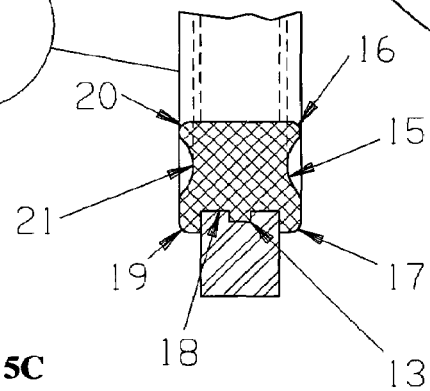
FIG. 5C

CHAIN JOINT SEAL

FIELD OF THE INVENTION

The invention in general relates to the field of seals for chain-driven systems, and more particularly to seals for limiting wear in pins and sidebars of chain link apparatuses.

BACKGROUND

Sprocket-driven chains are used in a variety of different applications. Some applications require the chains to operate in highly abrasive environments. One example is the use of chains in trenching operations, where various cutting or abrading attachments are included on the chain. In operation the chain is revolved about an extended arm or boom, and lowered into contact with the ground. When removing the soil, rock or other ground material, abrasive material comes into direct contact with the links of the chain. Similarly, chains used in conveyor or elevator operations may also be exposed to abrasive or corrosive materials. In both examples, if the abrasive material gets into the joint formed between the pins and sidebars of the links an early failure may occur, sometimes after mere hours of operation.

Several approaches have been suggested in the past for dealing with this general problem. One such can be seen in U.S. Pat. No. 4,094,515. This patent discloses, in one embodiment, the use of an annular rubber seal having an x-shaped cross-section, disposed between inner and outer sidebars of roller chain. The seal serves to both prevent the leakage of lubricant, used between the pin and bushing, and the ingress of dust. However, where a rubber seal of this type is exposed to more abrasive or corrosive materials than dust, it may itself become a point of early failure.

Another approach is disclosed in U.S. Pat. No. 5,269,729. This patent narrowly teaches the use of a two-element seal, with a first outer element having an annular groove and an inner resilient-ring element of uniform (circular or x-shaped) cross-section fitting within the annular groove. The structure of the outer metallic element is required to keep the second resilient element in relative position. Thus, such a two part structure is more costly and less convenient to make and maintain than older single-resilient seal approaches, such as taught in U.S. Pat. No. 4,094,515 (which, while more convenient, were much less resistant to early abrasion-induced failure).

Just such a solution to the problems noted above and more, are made possible by my invention disclosed here.

SUMMARY

This invention, while defined by the claims, may be better understood by reference to the embodiments described below, of which the following is a brief summary. In a preferred embodiment, a method and apparatus are disclosed for providing a seal between at least the outer link sidebar and pin bushing of a chain link assembly. The apparatus includes a seal having an outer collar and an inner resilient ring, the outer collar preferably having a mating ridge and the resilient ring being molded onto the collar. This seal also includes outer ribs for providing a sealed contact against the outer sidebar, and may include inner ribs. The seal is part of a chain link assembly positioned between the outer and inner sidebars and surrounding a pin bushing end. A fluid (e.g., grease) may be advantageously placed between the ribs, lubricating the rib—sidebar interface and thereby reducing wear of the ribs.

THE FIGURES

My invention may be more readily appreciated from the following detailed description, when read in conjunction with the accompanying drawings, in which:

FIGS. 1A-1B are views of a chain assembly in accordance with a first embodiment of the invention, in which:
FIG. 1A is a top view of the chain assembly;
FIG. 1B is a side view of the chain assembly;
FIG. 2 is a cross-sectional view of a sealed joint of the chain assembly of FIG. 1A;
FIGS. 3A-3C are views of a seal, for use in the chain assembly of FIG. 2, in accordance with a first embodiment of the invention, in which:
FIG. 3A is side cross-sectional view of the seal;
FIG. 3B is a top view of the seal of FIG. 3A;
FIG. 3C is an exploded view of the seal of FIG. 3A;
FIGS. 4A-4C are views of a seal in accordance with a second embodiment of the invention, in which:
FIG. 4A is side cross-sectional view of the seal;
FIG. 4B is a top view of the seal of FIG. 4A;
FIG. 4C is an exploded view of the seal of FIG. 4A;
FIGS. 5A-5C are views of a seal in accordance with a third embodiment of the invention, in which:
FIG. 5A is side cross-sectional view of the seal;
FIG. 5B is a top view of the seal of FIG. 5A;
FIG. 5C is an exploded view of the seal of FIG. 5A.

DESCRIPTION OF AN EMBODIMENT OF THE INVENTION

These limitations of the prior approaches are overcome by the present invention. In a preferred embodiment, an improved seal is provided in which the outer collar is firmly joined to the inner resilient material, the outer collar preferably having a mating feature (ridge or depression) along its inner side and the resilient material being molded onto the collar's inner side. In this manner the collar is kept in the same relative position to the resilient material, and the multi-part seal is more easily made and placed/replaced on chain link assemblies. Also, the seal preferably includes side ribs for providing a sealed contact against the outer link sidebar and, alternatively, the inner sidebar. A lubricant may also be used between the ribs, advantageously reducing the wear on the ribs and improving the overall seal.

An exemplary chain link assembly in which this improved seal may be beneficially used can be seen in FIGS. 1A and 1B. The particular assembly illustrated is a fixed bushing—attachment chain, of the type used in special conveyors, elevators, and the like, where further members (e.g., conveyor buckets) can be readily attached to the attachment lugs. The attachment lugs in the case of FIG. 1A are outer attachments, also forming the outer link sidebars 2, 3 of the chain link assembly 1. These outer sidebars are joined to inner block link sidebars 4, 5 via coupling pin 6. The coupling pin 6 has a head end fitting against the outer sidebar, and is held in place by an interference fit and also a cotter 7 at the opposite pin end. A bushing 8 fits around the pin in the space between the opposing outer link sidebars 2, 3, with the inner block link sidebars 4, 5 fitting inside the outer sidebars 2, 3 and over the bushing 8.

FIG. 2 provides a cross-sectional view of the chain link assembly 1 along the line A-A, at the head end of the pin 6. The pin 6 fits through both the outer link 2 and bushing 8, and inner sidebar 4 fits over bushing 8. In most applications the inner sidebar 4 is dimensioned to have interference fit over bushing 8 so as to minimize rotation relative to the bushing 8.

For many chain link applications no further washer or seal is needed between the inner and outer sidebars. However, in certain environments, such as those in which the chain link is exposed to abrasive or corrosive materials, a seal is beneficial in extending the life of the pin—sidebar—bushing joint. If abrasive material gets into this joint, the heavy loading and constant movement of the chain link will lead to premature wear and frequent replacement or failure of the chain link parts. In order to minimize this wear, seal 10 is positioned around bushing 8 and between the outer and inner sidebars 2, 4.

FIGS. 3A through 3C provide a more detailed view of a presently preferred embodiment of seal 10. This seal includes two different members—an outer collar 11 and inner ring 12. The outer collar 11 is made of a substantially harder material than the inner ring 12, and helps to minimize the abrasion or corrosion of the seal 10. Collar 11 may be made from a metal, such as a hardened steel, a zinc-plated carburized steel, etc. Non-metallic or composite compositions may also be used in appropriate applications. Inner ring 12 may be made from any resilient material, and serves to form the actual seal between the sidebar—bushing joint. Nitrile rubber is a convenient material to use for inner ring 12, since it is easy to mold or position on outer collar 11, but other rubbers or soft plastics may also be used depending on the type of wear (e.g., from the expected loading and abrasion/corrosion) anticipated.

The outer collar 11 preferably includes at least one indent (or alternatively, ridge(s) or other uneven structure) 13 on its inner circumferential side. This indent 13 helps to hold the inner ring 12 in a fixed position relative to the outer collar 11. Also, a superior fit can typically be achieved by molding the inner ring 12 to the outer collar 11, although the two parts 11, 12 may be separately formed and then joined.

The inner ring also includes a protrusion 14 which extends outwardly from the outer side of collar 11 (i.e., the side which is positioned against the outer sidebar 2). In a preferred embodiment, the protrusion 14 together with one or more ribs 14 form spaced-apart lips 14, 16 that define at least one pocket/indentation 15 between the lips 14, 16. When used in the chain link assembly, the pocket 15 is preferably packed with a lubricant (e.g., grease), and the lips 14, 16 are positioned in compressive contact with the outer sidebar 2. Thus, as the sidebars 2 and 3 rotate with pin 6 and relative to seal 10, the grease lubricates the interface between the lips 14, 16 and outer sidebar 2 and 3, reducing the coefficient of friction at this interface.

FIGS. 4A through 4C illustrate a first alternative seal 10. This seal is the same as the seal of FIG. 3A, except the protrusion 17 extends radially outward over a portion of the outer side of collar 11. This extended protrusion expands the primary region of contact between the seal 10 and outer sidebar 2, for a better seal. It also helps keep the collar 11 more firmly positioned in the resilient ring 12. Similar to the first embodiment, the rib 16 together with protrusion 17 defines indentation 15, and alternative seals with just the protrusion 17 (i.e., no rib 16) may be used.

Another alternative of seal 10 is illustrated in FIGS. 5A through 5C. Here, collar 11 is formed as a narrower band fitting within ring 12, with the radially extending sides of ring 12 overlapping the radially extending sides of collar 11. An indentation 13 and ridge 18 of collar 11, together with protrusions 17 and 19 of ring 12, firmly position the collar/band 11 relative to the ring 12. Lips 16, 17 define pocket 15, and lips 19, 20 similarly define an indentation 21. As with pocket 15, pocket 21 is packed with lubricant. When placed between outer and inner sidebars 2, 3, each set of lips forms a lubricated seals against its respective outer and inner sidebar 2, 3.

This further protects the assembly 1 by keeping all abrasive material outside of the interface between the inner sidebar 3 and seal 10, and not just the interface with the outer sidebar 2. Alternatively, one can only pack the pocket that will be positioned adjacent the outer sidewall.

Of course, one skilled in the art will appreciate how a variety of alternatives are possible for the individual elements, and their arrangement, described above, while still falling within the spirit of my invention. Thus, for example, other hard materials can be used in lieu of metal for collar 11, and other resilient materials besides rubbers and soft plastics may be used for the ring 12. Further, while the collars illustrated above were shown as having a substantially square cross-section, its radial dimension may be less or more, so, for example, the collar could form no more than a narrow band outside of the resilient ring 12 while still accomplishing its functionality of providing a more wear resistant surface around the resilient ring 12.

While the above describes several embodiments of the invention used primarily in connection with a method and apparatus for a chain link seal, those skilled in the art will appreciate that there are a number of alternatives, based on system and production design choices, that still fall within the spirit of my invention. Thus, it is to be understood that the invention is not limited to the embodiments described above, and that in light of the present disclosure, various other embodiments should be apparent to persons skilled in the art. Accordingly, it is intended that the invention not be limited to the specific illustrative embodiments but be interpreted within the full spirit and scope of the appended claims.

I claim:

1. A seal for limiting wear in a chain link assembly, the chain link assembly having alternating pairs of inner and outer spaced-apart sidebars joined by pin assemblies that include a bushing, the seal comprising:

a wear-resistant collar having an inner circumferential surface including a first substantially flat portion and at least one of the group of a mating protrusion and mating indentation;

a resilient member positioned radially inward of the collar, comprising an outer circumferential surface shaped to engage the inner circumferential surface of the collar, an axially extending outer side having a first protrusion thereon and an axial thickness greater than the axial thickness of the collar, for forming a sealing contact against an outer sidebar, and an inner circumferential surface for forming a sealing contact with a bushing.

2. The seal of claim 1, wherein the collar comprises a metal, and the resilient member is in molded contact with the collar, whereby the outer circumferential surface substantially conforms to the inner circumferential surface of the collar.

3. The seal of claim 1, wherein the first protrusion of the resilient member comprises two spaced apart ribs defining a pocket between the ribs.

4. The seal of claim 1, further comprising a radially extending inner side having a second protrusion thereon for forming a sealing contact against an inner sidebar.

5. The seal of claim 4, wherein the collar has radially extending inner and outer sides, and the first and second protrusions both extend radially outwardly over a portion of the inner and outer sides of the collar.

6. The seal of claim 4, wherein the first protrusion of the resilient member comprises spaced apart first ribs defining a pocket between the ribs, and second protrusion of the resilient member comprises spaced apart second ribs defining a pocket between the ribs.

7. The seal of claim 6, wherein at least one pocket of the first and second ribs are at least partially filled with lubricant.

8. An apparatus including a chain link assembly comprising:
   alternating pairs of inner and outer spaced-apart sidebars joined by pin assemblies that include respective bushings;
   first and second seals positioned around a bushing of a first pin assembly, the first seal positioned between the first outer sidebar and a first inner sidebar, the second seal positioned between the second outer sidebar and second inner sidebar, each seal comprising:
   a collar having an inner circumferential surface including a substantially flat surface with at least one of the group of a mating protrusion and mating indentation, an axial thickness;
   a resilient member positioned radially inwardly of the collar, comprising an outer circumferential surface shaped to engage the inner circumferential surface of the collar,
   an axially extending first side having a first protrusion thereon and an axial thickness greater than the axial thickness of the collar, and an inner circumferential surface for forming a sealing contact with the bushing, and a second protrusion on a radially extending second side radially outward the first side;
   wherein the first protrusion of each of the first and second seals, respectively, sealingly contact the first and second outer sidebars, respectively.

9. The apparatus of claim 8, wherein the first protrusion of the first seal sealingly contacts the first outer sidebar.

10. The apparatus of claim 9, wherein the pin assembly further comprises a pin extending through the outer sidebars, and wherein the bushing surrounds the pin between the outer sidebars, and wherein the first protrusion of the first seal comprises plural spaced apart ribs defining a pocket between the ribs.

11. The apparatus of claim 9, wherein the collar is a metal, and the resilient member is molded to the collar, whereby the outer circumferential surface complimentarily matches the inner circumferential surface of the collar, and the first and second protrusion of the resilient member comprises plural spaced apart ribs defining a pocket between the ribs, the ribs of the first and second protrusions being compressed against the outer and inner sidebars, respectively.

12. The apparatus of claim 11, wherein at least one pocket is at least partially filled with lubricant so the ribs are lubricated during operation of the assembly.

13. The apparatus of claim 8, wherein the collar of the first seal has radially extending inner and outer sides, and the first and second protrusions extend radially outwardly over a portion of the inner and outer sides of the collar.

* * * * *